United States Patent [19]

Dubois et al.

[11] Patent Number: 4,636,411
[45] Date of Patent: Jan. 13, 1987

[54] PROCESS FOR TREATING GLASS CONTAINERS WITH A PROTECTIVE VARNISH, AND PROTECTING VARNISH USED

[76] Inventors: Jean G. Dubois, "En Bagatelle"; Michel Hesling, Rue Raymond Dorey, both of 71700 Tournus, France

[21] Appl. No.: 711,855

[22] Filed: Mar. 14, 1985

[51] Int. Cl.$^4$ .......................... C08K 3/20; B05D 3/02
[52] U.S. Cl. .................. 427/314; 427/389.7; 523/402; 523/403; 523/404; 523/406; 523/412; 523/415; 523/418
[58] Field of Search .............. 427/314, 389.7; 525/113, 939; 523/402, 405, 406, 409, 412, 415, 417, 418, 420, 404; 524/906

[56] References Cited

U.S. PATENT DOCUMENTS

| | | | |
|---|---|---|---|
| 3,285,802 | 11/1966 | Smith et al. | 428/429 X |
| 3,723,223 | 3/1973 | Le Compte | 156/313 |
| 4,056,208 | 11/1977 | Prejean | 215/12 R |
| 4,140,836 | 2/1979 | Wallace | 428/463 |
| 4,143,181 | 3/1979 | Cahn et al. | 427/389.7 X |
| 4,255,311 | 3/1981 | Eldin et al. | 523/412 |
| 4,285,849 | 8/1981 | Dowbenko et al. | 525/113 |
| 4,303,565 | 12/1981 | Tobias | 523/412 |
| 4,335,829 | 6/1982 | Christenson et al. | 427/386 X |
| 4,442,247 | 4/1984 | Ishikura et al. | 523/414 |
| 4,555,412 | 11/1985 | Günter et al. | 523/402 X |

Primary Examiner—Thurman K. Page
Attorney, Agent, or Firm—Marshall, O'Toole, Gerstein, Murray & Bicknell

[57] ABSTRACT

A process for treating glass containers, consisting of applying to the surface of the said containers, heated to a temperature of 80° to 150° C., a composition containing (a) a chemically drying binding agent consisting of an emulsifiable liquid or solid epoxy resin and either a water-soluble polyaminoamide resin having an amine index between 150 and 200, or an organosoluble solid amine adduct, or a mixture of the two and (b) a physically drying binding agent consisting of a cationic emulsion containing an acrylic polymer or a polyurethane.

18 Claims, No Drawings

PROCESS FOR TREATING GLASS CONTAINERS WITH A PROTECTIVE VARNISH, AND PROTECTING VARNISH USED

The invention relates to a process for treating glass containers with a varnish in order to improve the scratch-resistance and impact strength of the glass and increase its slip, and to a composition used therein.

For many years, a process has been known for treating glass containers which essentially comprises two phases: (1) a hot treatment, also called "hot end" treatment, with metal salts such as tin salts or titanium salts applied to the articles at a temperature of 500° to 600° C., and (2) a cold or "cold end" treatment involving the application of wax or various fatty substances to the containers at a temperature of about 100° C. The process is designed to improve the scratch-resistance and impact-strength of the glass containers and to lubricate them.

The improvement of the strength and slip of glass containers is especially important in view of the fact that such containers are washed and filled in mechanical devices in which they are caused to travel at great speed and in which there is the risk of breakage or machine-stoppage if their strength and slip are inadequate.

The known process has, however, the disadvantage of employing very costly tin salts and titanium salts. The salts used also present problems related to risks of pollution.

It has now been discovered that this two-stage process can be replaced by a treatment employing two types of compatible binding agent: (1) a chemically-drying binding agent which provides the requisite properties but requires several hours to become crosslinked, and (2) a physically-drying binding agent which enables rapid drying to be obtained with adequate hardness for end-of-line handling operations, i.e., within a few minutes.

Such treatment, which does not employ tin salts and titanium salts, surprisingly enables the strength of glass containers and their slip to be improved.

However, in the case of bottles or flasks of super-thin glass, one can, in order to increase the safety in use by improving the resistance to explosion, combine the classic hot treatment using tin or titanium salts with the varnish treatment. This permits a further reduction in thickness while combining the production of containers of excellent quality.

The process for treating glass containers according to the invention is one in which there is applied to the surface of the said containers, heated to a temperature of 80° to 150° C., a composition comprising:

(a) a chemically drying binding agent consisting of an emulsifiable liquid or solid epoxy resin and either a water-soluble polyaminoamide resin having an amine index between 150 and 250, or an organosoluble solid amine adduct, or a mixture of the two, and (b) a physically drying binding agent consisting of a cationic aqueous emulsion containing acrylic polymers, polyurethanes or other polymers having the same ionic character.

In the case of super-thin glass, the treatment can be preceded by a "hot-end" treatment with salts of tin or titanium.

The epoxy resin used in the process according to the invention can be a resin which is the reaction product of epichlorohydrin and bisphenol A, or a mixture of bisphenol A and bisphenol F, having from 150 to 500 epoxy equivalents, with or without a reactive diluent. For this purpose, suitable products include those marketed under the names RESIN J 157 by Shell, ARALDITE PY 340 by Ciba-Geigy, LOPOX 205 AE by CDF, EUREPOX 756 by Shering and BECKOPOX EP 122 by Hoechst.

The polyaminoamide resins useful in the invention have the formula

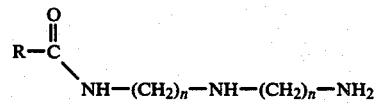

wherein R is a fatty acid residue and n is an appropriate integer. Suitable polyaminoamide resins used in association with the epoxy resin are the products marketed under the names ARALDITE HZ 340 by Ciba-Geigy, LOPOX D508 by CDF and EUREDUR 429-XE 430 by Shering.

The ratio of the epoxy resin to the polyaminoamide resin can vary between 1:0.5 and 1:3 and is preferably about 1:1 by weight.

The amine adduct which can be used in place of, or in admixture with, the polyaminoamide resin in association with the epoxy resin is the reaction product of two moles of a polyamine with one mole of an epoxy. A typical amine adduct may have the formula

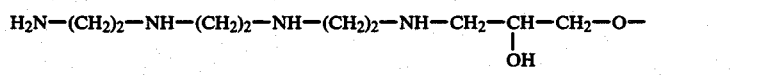

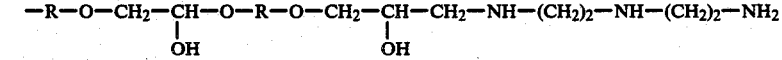

wherein R is 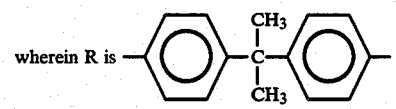

The amine adducts useful in the invention are organosoluble and have softening points preferably from 50° to 75° C. and hydrogen equivalents from 150 to 450. The adducts are rendered water-soluble by acidification with an organic acid, such as acetic acid. Amine adduct resins which can be used are, among others, ARALDITE HT 834 (Ciba), EPICURE 104 (Shell), EPINORAMA 362 M (Ceca) and HARTER SVP (Harburger Fettchemie). The acidified solution used has a pH of about 7 to 8. The ratio of the epoxy resin to the amine adduct is between 1:0.5 and 1:3 by weight, the preferred ratio being about 1:1.5.

The preferred cationic emulsions used as physically drying binding agent are, in particular aqueous cationic dispersions of self-crosslinking acrylic resins, having the general formula

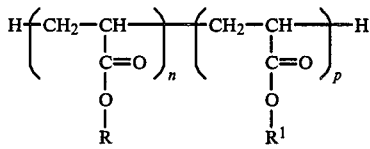

wherein n and p are integers such that
$p/(n+p) < 0.25$;
R is a $C_4$-$C_{13}$ alkyl group and $R^1$ is —$NHCH_2OH$ or —$N(CH_2OH)_2$. Suitable resins include the products sold under the names PLEXTOL DV 588 by Rohm, CRYLMUL 270 R and CRYMUL 255 R by Protex, and BASOPLAST 258 and 280 BASF.

The ratio of the chemically drying binding agents to the physically drying binding agents depends on the hardening conditions and the properties required. This ratio can vary widely betwen about 1.5:1 and 9:1 by weight, the best compromise being about 4:1.

The total solids, i.e., non-volatile, content of the composition used to treat glass containers in accordance with the invention depends on practical consideration, such as the effectiveness of the spray equipment and the thickness of the desired film. Suitable total solids concentrations range from 1 to 10% by weight.

The compositions according to the invention can also contain various additives and, more especially, silanes which improve the adherence to the glass, such as, more especially, the gamma-glycidoxypropyltrimethoxy silanes, such as the product sold under the name SILANE 187 by Union Carbide, in a percentage between 10 and 30% of the dry binding agent.

The hardness and the slip can be improved by incorporating in the composition a non-ionic aqueous dispersion of oxidized polyethylene wax, the softening temperature of which can vary between approximately 95° C. for the low molecular weight waxes to 150° C. for the high molecular weight waxes. Suitable for this purpose are the waxes EN 14 sold by Polychimie, Forbest VP-PEOX sold by Lucas Meyer, AQUACER 502 or 531 sold by Cerachemie, and DISPERSION C-1614 sold by Polychimie.

The compatibility with label adhesives is further improved by a complement of an emulsifier derived from alkylphenol with a suitable hydrophobic-lipophobic balance (HLB) index, e.g., 15–25. For this purpose, there can be mentioned the emulsifiers sold under the names NATAROC CO 990 by GAF, IGEPAL CO 997 of Polychimie, ANTAROX CO (970) of GAF, HUMIPHEN BA 77 of GAF, TWEEN 20 of Atlas, CIRRASOL of Atlas and MYRJ of Atlas. The wax is used in proportions from 10 to 40% by weight of the dry binding agent, and the emulsifier in proportions from 10 to 30% by weight of the dry binding agent.

The compositions according to the invention can also contain as an additive a polyvinylpyrrolidone or a copolymer thereof with vinyl acetate, styrene, or diemthylaminoethylmethacrylate. The molecular weight of such additives is preferably between 1000 and 500,000.

The solvent medium used can consist of water or a mixture of water and an organic solvent chosen from the alcohols and glycols. These compositions can take the form of solutions such as aqueous solutions or hydro-alcoholic solutions.

Depending on the nature of the procedures used, the compositions can also take the form of emulsions or of colloidal solutions based on the solvents mentioned above. In the case of emulsions, alkyl ethers of diethylene glycol are preferably used, such as diethylene glycol monobutyl ether. This type of solvent is used in proportions ranging up to 30% and, especially in the case where emulsions are used, it permits a clear, transparent film to be produced on the glass containers.

The compositions thus prepared have relatively limited shelf life, and it is generally preferred to prepare them immediately before use. They can, however, be preserved for several days.

According to one preparation process, the composition is prepared by mixing a part A containing the epoxy resin dissolved in an organic solvent with a part B containing the polyaminoamide resin or amine adduct in solution. After these are mixed, there is further prepared a part C containing the physically drying binding agent together with other various additives and a solvent. Parts A and B are then mixed with part C in the ratios indicated above.

After being prepared, the compositions are applied directly to the glass containers as they emerge from the production lines, when these containers are hot, i.e., at a temperature of 80° to 150° C., and preferably 100° to 140° C. The application can be performed by spraying using a pneumatic spraygun. The film will have to cover at least the external surface of the glass container, be continuous and have a thickness which can vary, according to the result desired, preferably between 0.5 and 5 microns. After application, the article is cleaned with water. Glass containers coated with this film have a very high slip, and an improved resistance to scratching, pasteurization, storage in an especially active medium and rinsing with hot caustic sods solution. In addition, the coating discourages mold growth. This process also enables the glass containers to be used directly at the end of the line, by virtue of the very rapid drying.

The slip obtained in accordance with the invention is superior to that produced in the conventional treatment which gives a frictional angle of about 8 to 13°, and it is also possible to vary the slip because the method of obtaining a lower slip is known. The scratch-resistance is also improved.

The compositions used in the invention can be prepared in the form of ready-to-use compositions or in the form of kits incorporating the various components to be mixed at the time of use. It is also possible to prepare these compositions in concentrated form, in which case the concentrations of resin can range up to 10 times those stated above.

The examples which follow are intended to illustrate the invention without being in any way limiting in nature.

EXAMPLE 1

The following composition for protecting glass was prepared. There was first prepared a composition A containing the resin J-157 sold by SHELL in 10% strength solution in demineralized water.

There was further prepared a composition B containing the polyaminoamide product sold under the name XE-430 by SHERING in 5% strength solution in demineralized water.

There was then prepared a part C by mixing Plextol DV 588, Aquacer 502, Silane 187, Bevaloid 6935 (a silicone oil) and butyldiglycol.

Parts A, B, and C were mixed with slow stirring, in appropriate relative amounts to produce the following composition:

| | | |
|---|---|---|
| RESIN J-157 | 0.5 g | |
| XE-430 | 1.0 g | |
| PLEXTOL DV 588 | 0.5 g | |
| AQUACER 502 | 0.715 g | |
| SILANE 187 | 0.250 g | |
| BEVALOID 6935 | 0.4 g | |
| Butyldiglycol | 9.11 g | |
| Demineralized water | 87.54 g | |

The composition can be preserved for a period longer than 24 hours. It is applied to bottles at a temperature of 120° to 140° C. by means of a pneumatic spraygun.

After the product is dried for 7 minutes at 40° C., excellent scratch-resistance is observed. This product is compatible with the usual casein-based glues and vegetable glues for treated glass.

EXAMPLE 2

The following compositions are prepared:

| Part A | |
|---|---|
| ARALDITE PY 340 | 5.0 g |
| Butyldiglycol | 75.0 g |
| Demineralized water | 15.0 g |
| SILANE A-187 | 5.0 g |
| Part B | |
| ARALDITE HT 834 | 14.0 g |
| Butylethylglycol | 21.7 g |
| Acetic acid | 1.6 g |
| Demineralized water | 62.7 g |
| Part C | |
| PLEXTOL DV 588 | 10.0 g |
| Demineralized water | 79.5 g |
| Ammonia solution | 0.5 g |
| WAX EN 14 | 10.0 g |

Part C is in the form of an emulsion, while parts A and B are in the form of solutions.

Ten parts of Part A is mixed with 5 parts of Part B to form composition 1. Five parts of part C is mixed with 80 parts of demineralized water to form composition 2. Composition 1 is then added to composition 2 slowly and with agitation. The resulting product is applied to hot glass containers, at 100°-140° C., by means of a robot spraygun. The resulting product is applied to a hot glass container, at 100°-140° C., by means of a robot spraygun.

The thickness deposited is from 1 to 2 microns. The container is washed with water.

The hardness and strength on emerging from the line are excellent, and improve over 48 hours.

The foregoing detailed description has been given for clearness of understanding only and no unnecessary limitations should be understood therefrom as modifications will be obvious to those skilled in the art.

WHAT IS CLAIMED IS:

1. Process for treating glass containers, wherein there is applied to the surface of the said containers, heated to a temperature of 80° to 150° C., an aqueous composition comprising:
   (a) a chemically drying binding agent consisting of an emulsifiable liquid or solid epoxy resin and either a water-soluble polyaminoamide resin having an amine index from 150 to 250, or an organosoluble solid amine adduct, or a mixture of the two, and
   (b) an aqueous physically drying binding agent consisting of a cationic emulsion containing an acrylic polymer or a polyurethane.

2. Process of claim 1 in which said epoxy resin is based on bisphenol A or bisphenol A+F/epichlorohydrin and has 150–500 epoxy equivalents.

3. Process of claim 1 in which the weight ratio of said epoxy resin to said polyaminoamide is between 1:0.5 and 1:3.

4. Process of claim 1 in which the amine adduct used in association with the epoxy resin has a softening point from 50° to 75° C. and a hydrogen equivalent from 150 to 450.

5. Process of claim 1 in which the amine adduct is made water-soluble by acidification with an organic acid.

6. Process of claim 1 in which the weight ratio of the epoxy resin to the amine adduct is between 1:0.5 and 1:3.

7. Process of claim 1 in which the cationic emulsion used as a physically drying binding agent is an aqueous cationic dispersion of a self-crosslinking acrylic resin.

8. Process of claim 1 in which the ratio of chemically drying binding agent to physically drying binding agent is between 1.5:1 and 9:1.

9. Process of claim 1 in which the composition used in the process contains in addition a silane to improve the adherence to glass.

10. Process of claim 9 in which said silane is gamma-glycidoxypropyltrimethoxysilane.

11. Process of claim 1 in which the composition contains in addition a non-ionic dispersion of oxidized polyethylene wax having a softening point between 95° C. and 150° C.

12. Process of claim 1 in which the composition contains an emulsifier derived from alkylphenols.

13. Process of claim 11 in which the wax is used in the proportion of 10 to 40% by weight of the dry binding agents and in which the emulsifier is used in a proportion of 10 to 30% by weight of the dry binding agent.

14. Process of claim 1 in which the composition contains in addition a polyvinylpyrrolidone or a copolymer thereof having a molecular weight between 1000 and 500,00.

15. Process of claim 1 in which the composition is an emulsion or a colloidal solution incorporating a solvent selected from water and organic solvents.

16. Process of claim 15, in which said solvent is diethylene glycol alkyl ether.

17. Process of claim 1 wherein the composition is applied to glass containers as they emerge from a production line at a temperature of 80° to 150° C., by spraying so as to form a continuous coating on the surface of the container, and wherein said containers are cleaned with water after the application of said composition.

18. Process for preparing a composition adapted for application to glass containers for improving the scratch-resistance, impact strength, and slip thereof, said process comprising the steps of:
   mixing a part A containing a chemically drying binding agent consisting of an emulsifiable liquid or solid epoxy resin dissolved in an organic solvent, and a part B containing either a water-soluble polyaminoamide resin having an amine index between 150 and 200, or an organosoluble solid amine adducts, or a mixture thereof, in solution;
   preparing a part C containing a physically drying binding agent consisting of an aqueous cationic emulsion containing an acrylic polymer or a polyurethane, and
   mixing parts A, B and C.

* * * * *